(12) United States Patent
Nakajima et al.

(10) Patent No.: US 6,713,118 B2
(45) Date of Patent: Mar. 30, 2004

(54) EDIBLE OIL AND PRODUCTION PROCESS THEREOF

(75) Inventors: Yoshinobu Nakajima, Tokyo (JP); Tsutomu Nishide, Tokyo (JP); Tadashi Sakuma, Tokyo (JP)

(73) Assignee: Kao Corporation, Tokyo (JP)

( * ) Notice: Subject to any disclaimer, the term of this patent is extended or adjusted under 35 U.S.C. 154(b) by 221 days.

(21) Appl. No.: 09/907,811

(22) Filed: Jul. 19, 2001

(65) Prior Publication Data

US 2002/0045000 A1 Apr. 18, 2002

(30) Foreign Application Priority Data

Jul. 19, 2000 (JP) ........................................ 2000-218813

(51) Int. Cl.⁷ .................................................. A22D 9/00
(52) U.S. Cl. ........................ 426/606; 426/601; 426/611
(58) Field of Search ................................. 426/601, 611, 426/606

(56) References Cited

U.S. PATENT DOCUMENTS

| 6,025,348 | A | * | 2/2000 | Goto et al. | ................ | 514/182 |
| 6,139,897 | A | * | 10/2000 | Goto et al. | ................ | 426/601 |
| 6,326,050 | B1 | * | 12/2001 | Goto et al. | ................ | 426/601 |
| 6,337,414 | B1 | | 1/2002 | Sugiura et al. | | |
| 6,495,536 | B1 | * | 12/2002 | Masui et al. | ................ | 514/182 |

FOREIGN PATENT DOCUMENTS

| EP | 0990391 | * | 4/2000 |
| JP | 52-8309 | | 8/1977 |
| JP | 60-81200 | | 9/1985 |
| WO | WO 98/01126 | | 1/1998 |
| WO | WO 98/38206 | | 9/1998 |
| WO | WO 99/48378 | | 9/1999 |

OTHER PUBLICATIONS

1p. English Abstract DialogWeb Command Mode of Japanese Patent Publication No. *Sho* 49–005959.
1p. English Abstract DialogWeb Command Mode of Japanese Patent Application Laid–Open (*Kokai*) AS above.

* cited by examiner

*Primary Examiner*—Carolyn Paden
(74) *Attorney, Agent, or Firm*—Oblon, Spivak, McClelland, Maier & Neustadt, P.C.

(57) ABSTRACT

Disclosed herein are an edible oil containing at least 15% by weight of diacylglycerol and 2 to 10% by weight of phytosterol and being a transparent liquid at normal temperature, wherein the content of hydrocarbons having 29 to 31 carbon atoms in the oil and fat is at most 1 part by weight per 100 parts by weight of the phytosterol. The edible oil dissolve phytosterol at a high concentration therein and cause no turbidity at a low temperature.

13 Claims, No Drawings

EDIBLE OIL AND PRODUCTION PROCESS THEREOF

BACKGROUND OF THE INVENTION

1. Field of the Invention

The present invention relates to an edible oil which contains phytosterol having a blood cholesterol-reducing effect in the form of a stable solution therein and causes no turbidity even at a low temperature.

2. Discussion of the Background

Phytosterol is known to effectively reduce blood cholesterol and is contained in plant seeds. Phytosterol is also contained in an amount of about 0.1 to 1% by weight in ordinary vegetable edible oils. In natural products, this phytosterol is present in the form of an ester with a fatty acid or the like, a glycoside bonded to a sugar, a free phytosterol, or the like. Most of these phytosterols are hydrolyzed in stages of extraction from natural products, and as a result of their concentration and purification are typically present in a state of a free phytosterol. However, the solubility of the free phytosterol in triglyceride can be as low as about 1.5% by weight in ordinary salad oil, which has offered a problem from the viewpoint of incorporating a high concentration of phytosterol into an edible oil and fat.

Therefore, various technical developments have been made with a view toward increasing the solubility of the phytosterol in an edible oil and fat. The present inventors have previously reported that oil and fat containing a fatty acid ester of a polyhydric alcohol, which has a degree of esterification of at least 2 and at least one unesterified hydroxyl group, particularly an oil and fat containing at least 15% by weight of diacylglycerol can dissolve phytosterol in large amounts (WO 99/48378).

However, even oil and fat containing at least 15% by weight of diacylglycerol has involved a problem that turbidity may occur in the edible oil and fat at a low temperature of 0 to 5° C. depending on the type of the phytosterol used and so its commercial value is markedly lowered.

There is thus a demand for the development of an edible oil and fat which contains phytosterol having a blood cholesterol-reducing effect in the form of a stable solution therein and suffers no turbidity even at a low temperature.

SUMMARY OF THE INVENTION

The present inventors have carried out an investigation as to the content of trace constituents contained in a phytosterol composition extracted from a natural product which has been purified and determined the solubility of the composition in diacylglycerol-containing oils and fats. As a result, it has been found that when the content of hydrocarbons having 29 to 31 carbon atoms in the composition is controlled, the solubility of photosterols is improved to provide good edible oil and fat which cause no turbidity even at a low temperature (for example, 0 to 5° C.).

According to the present invention, there are thus provided an edible oil and fat composition comprising: a) at least 15% by weight of diacylglycerol; b) 2 to 10% by weight of phytosterol; and c) a fat or oil, said composition being a transparent liquid at normal temperature, wherein the content of hydrocarbons having 29 to 31 carbon atoms in the oil and fat is at most 1 part by weight per 100 parts by weight of the phytosterol, and a production process thereof.

Within the context of the present invention the term "oil and fat" is used. It will be appreciated by those of skill in the art that an oil may be considered a fat and a fat may be considered an oil. Accordingly, within the context of the present invention, the term oil may also include a fat.

DETAILED DESCRIPTION OF THE PREFERRED EMBODIMENTS

The edible oil and fat according to the present invention can be produced by controlling the content of hydrocarbons having 29 to 31 carbon atoms, which are impurity components contained in a phytosterol composition obtained from a natural product and dissolving such a phytosterol composition in oil and fat containing a certain amount or more of diacylglycerol.

Non-limiting examples of the phytosterol used in the present invention include α-sitosterol, β-sitosterol, stigmasterol, campesterol, brassicasterol, α-sitostanol, β-sitostanol, stigmastanol and campestanol, and besides fatty acid esters and glycosides thereof. One or more of the above-mentioned phytosterols may be suitably selected for use. These phytosterols can be obtained by extracting and purifying phytosterols from deodorized distillates of plants or vegetable oils and fats, or tall oil in accordance with the methods described in Japanese Patent Publication No. 8309/1977, Japanese Patent Application Laid-Open No. 81200/1985, WO 98/38206, WO 98/01126 and the like and conducted heretofore, and further subjecting the extracted and purified product to a hydrogenation reaction or an esterification reaction. Since these phytosterols are prepared by extraction and purification of natural products, they are generally present in the form of a mixture containing several kinds of phytosterols and further handled as a phytosterol composition containing several percent of impurities other than the phytosterols.

In the present invention, the total content of hydrocarbons having 29 to 31 carbon atoms in this phytosterol composition is preferably at most 1 part by weight, more preferably at most 0.9 parts by weight per 100 parts by weight of the phytosterol. Further, the content of the hydrocarbons having 31 carbon atoms is preferably at most 0.6 parts by weight. The hydrocarbons having 29 to 31 carbon atoms include nonacosane, triacontane, squalene and hentriacontane. If the hydrocarbons having 29 to 31 carbon atoms are contained in a proportion exceeding 1 part by weight, turbidity occurs when an edible oil obtained by dissolving such a phytosterol composition in oil and fat containing at least 15% by weight of diacylglycerol is stored at 0 to 5° C. Incidentally, the weight of the phytosterol is a value in terms of a free phytosterol.

The edible oil composition according to the present invention is a transparent liquid at normal temperature. Within the content of the present invention a normal temperature is $\leq 5°$ C., preferably $\leq 0°$ C. The upper limit of normal temperature is not particularly limited but is preferably $\leq 30°$ C., more preferably $\leq 27°$ C. Also within the context of the present invention, a transparent liquid at normal temperature is a liquid which exhibits a ratio of transmission of $\geq 82\%$, preferably $\geq 85\%$, more preferably $\geq 90\%$, even more preferably $\geq 95\%$, as measured at 5° C. for 24 h, in a 1 cm cell path length, in a spectrophotometer at a wavelength of 600 nm.

In order to obtain the phytosterol composition, the total content of hydrocarbons having 29 to 31 carbon atoms in which is at most 1 part by weight per 100 parts by weight of the phytosterol, the content thereof can be controlled by operations such as distillation, crystallization and extraction in accordance with the respective methods known per se in the art in the process of extracting and purifying phytosterols from deodorized distillates of plants or vegetable oils and fats, or tall oil. Alternatively, such a phytosterol composition can be provided by partially removing the hydrocarbons having 29 to 31 carbon atoms from the resultant phytosterol by extraction and/or crystallization with a solvent. Further, phytosterol containing hydrocarbons having 29 to 31 carbon atoms in a proportion of at least 1 part by weight per 100 parts by weight of the phytosterol may be mixed with a phytosterol composition, the total content of hydrocarbons having 29 to 31 carbon atoms in which is at most 1 part by weight per 100 parts by weight of the phytosterol, thereby controlling the total content of the hydrocarbons having 29 to 31 carbon atoms within a range not higher than 1 part by weight before use.

The oil and fat used in the present invention is an oil and fat, containing diacylglycerol in an amount of at least 15% by weight, preferably 30 to 95% by weight, more preferably 55 to 95% by weight, particularly preferably 80 to 95% by weight.

The diacylglycerol can be prepared by the esterification reaction of, for example, a fatty acid obtained by distilling a hyrolyzate of oil and fat with glycerol in the presence of an enzyme such as a 1,3-position-selective lipase. The constitutive fatty acids of the diacylglycerol are preferably those having 8 to 24 carbon atoms, particularly 12 to 22 carbon atoms and containing unsaturated fatty acids in an amount of at least 55% by weight, particularly at least 70% by weight based on the total weight of the constitutive fatty acids.

In the present invention, it is preferred that a phytosterol composition in which the total content of hydrocarbons having 29 to 31 carbon atoms, is at most 1 part by weight per 100 parts by weight of the phytosterol is dissolved in the above-described oil and fat so as to give a concentration of 2 to 10% by weight, preferably not lower than 2% by weight, but lower than 5% by weight, particularly preferably 3 to 4.5% by weight in the resulting edible oil and fat. Therefore, the hydrocarbons having 29 to 31 carbon atoms is preferably contained in a proportion of at most 450 ppm in the edible oil and fat. Incidentally, the concentration of the phytosterol in the edible oil and fat is also a value in terms of a free phytosterol. When the phytosterol composition is added to and dissolved in oil and fat containing at least 15% by weight of diacylglycerol, the content of the diacylglycerol in the resulting edible oil and fat may be lowered to lower than 15% by weight in some cases. However, the content of the diacylglycerol in the final edible oil and fat is preferably controlled to be from 15% by weight or higher.

Additives may be added to the edible oil and fat according to the present invention so far as no detrimental influence is thereby imposed on the objects of the present invention. Examples of the additives include antioxidants such as tocopherols, ascorbyl palmitate, ascorbyl stearate, BHT, BHA, silicone and green tee extract; and emulsifiers such as glycerol fatty acid esters, polyglycerol fatty acid esters, polyglycerol polyricinolic acid esters, sucrose fatty acid esters, sorbitan fatty acid esters, polypropylene glycol fatty acid esters, organic acid monoglycerides, lecithin, enzymatically decompose lecithin and enzymatically modified lecithin.

The edible oil and fat according to the present invention may be used in exactly the same manner as ordinary edible oils and fats and applied to various kinds of food and drink making use of oil and fat. The edible oil and fat can be used in, for example, processed foodstuffs of oil-in-water type emulsified oils and fats, such as drinks, desserts, ice creams, dressings, toppings, mayonnaises and drippings for roast meat; processed foodstuffs of water-in-oil type emulsified oils and fats, such as margarine and spreads; processed oil and fat foodstuffs such as peanut butter, frying shortening and baking shortening; processed foodstuffs such as potato chips, snack confectionery, cakes, cookies, pies, bread and chocolates; and bakery mix, processed meat products, frozen entree and frozen food.

EXAMPLES (1) Phytosterols A, B, D, E, F and G:

Commercially available three Phytosterols (A, D and E), Phytosterol B obtained by mixing 80 parts by weight of Phytosterol A with 20 parts by weight of Phytosterol E, Phytosterol F obtained by mixing 70 parts by weight of Phytosterol A with 30 parts by weight of Phytosterol E, and Phytosterol G obtained by mixing 60 parts by weight of Phytosterol A with 40 parts by weight of Phytosterol D were provided.

These phytosterols were silylated (silylating agent: TH, product of Kanto Chemical Co., Inc.) by using n-tetracosane (product of Wako Pure Chemical Industries, Ltd.) as an internal standard and then analyzed under the following conditions by gas chromatography to conduct determination from a calibration curve separately prepared by using stigmasterol (product of Tama Biochemical Co., Ltd.) and n-nonacosane (product of Tokyo Kasei Kogyo Co., Ltd.) as standard samples. The compositions of Phytosterols A, B, D, E, F and G are shown in Table 1.

Conditions for Gas Chromatography:

| | |
|---|---|
| GC: | Hewlett Packard 5890 |
| Column: | J & W DB-5 (15 m × 0.25 mm × 0.1 $\mu$m) |
| Head pressure: | 60 Kpa |
| Flow rate: | 1.3 mL/min |
| Split ratio: | 30:1 |
| Injection volume: | 5 $\mu$L |
| Injection temp.: | 250° C. |
| Detection temp.: | 260° C. |
| Detector: | FID |
| Oven program: | 250° C. to 260° C. at 0.5° C./min. |

(2) Phytosterol C:

To 50 g of Phytosterol E were added 500 mL of hexane, and the mixture was stirred at 30° C. for 10 minutes and then cooled to room temperature. After phytosterol captured on filter paper after filtration was further washed with 100 mL of hexane, the solvent was distilled off under reduced pressure to obtain phytosterol C. The composition of Phytosterol C is shown in Table 1.

(3) Oil and Fat:

Oil and fat were obtained by mixing and heating 99.7 parts by weight of a diacylglycerol-containing oil (glyceride composition: triglyceride 14.3% by weight, diglyceride 84.5% by weight, monoglyceride 1.2% by weight; fatty acid composition: palmitic acid 3.0% by weight, stearic acid 1.3% by weight, oleic acid 38.9% by weight, linolic acid 47.3% by weight, linolenic acid 8.0% by weight, other fatty acids 1.5% by weight), 0.08 parts by weight of a polyglycerol fatty acid ester (product of Taiyo Kagaku (Chemical) Co., Ltd.), 0.2 parts by weight of mixed tocopherol (product of Riken Vitamin Co., Ltd.) and 0.02 parts by weight ascorbyl palmitate (product of Roche Co., Ltd.) into a solution.

Examples 1 to 4, and Comparative Examples 1 to 3

Edible oil and fat was obtained by mixing and heating 4 parts by weight of phytosterol and 96 parts by weight of the oil and fat into a solution. Incidentally, the edible oils and fats obtained by separately dissolving Phytosterols A, B, C and G were provided as those in Examples 1, 2, 3 and 4, and the edible oils and fats obtained by separately dissolving Phytosterols D, E and F were provided as those in Comparative Examples 1, 2 and 3.

Each of the edible oils and fats thus obtained was separately placed in a glass container, and the container was covered and stored at 5° C. and 0° C. for 24 hours to visually evaluate the condition thereof. Incidentally, the oil and fat to which no phytosterol was added were evaluated likewise as control oil and fat for the sake of comparison.

As a result, turbidity occurred in a range of 0 to 5° C. in the Comparative Examples as shown in Table 1, while the present products did not cause turbidity and remained transparent.

As described above, the edible oils and fats according to the present invention dissolve phytosterol at a high concentration therein and cause no turbidity at a low temperature.

Obviously, numerous modifications and variations of the present invention are possible in light of the above teachings. It is therefore to be understood that within the scope of the appended claims, the invention may be practiced otherwise than as specifically described herein.

This application is based on Japanese patent application JP 2000-218813 filed in the Japanese Patent Office on Jul. 19, 2000, the entire contents of which are hereby incorporated by reference.

What is claimed is:

1. An edible oil composition comprising:
   a) at least 15% by weight of diacylglycerol; and
   b) 2 to 10% by weight of phytosterol having a content of hydrocarbons having 29 to 31 carbon atoms of at most 1 part by weight per 100 parts by weight of the phytosterol, wherein said edible oil composition is a transparent liquid at from 0 to 5° C.

2. The edible oil composition according to claim 1, wherein said diacylglycerol is contained in an amount of from 30 to 95% by weight.

3. The edible oil composition according to claim 1, wherein said diacylglycerol is contained in an amount of from 55 to 95% by weight.

4. The edible oil composition according to claim 1, wherein said phytosterol is present in amount of 2% by weight to less than 5% by weight.

5. The edible oil composition according to claim 1, wherein said content of the hydrocarbons having 29 to 31 carbon atoms is at most 0.9 parts by weight per 100 parts by weight of the phytosterol.

TABLE 1

| Phytosterol | | Example 1 A | Example 2 B | Example 3 C | Example 4 G | Comp. Example 1 D | Comp. Example 2 E | Comp. Example 3 F | Control oil and fat |
|---|---|---|---|---|---|---|---|---|---|
| Composition | | | | | | | | | |
| β-Sitosterol | (wt. %) | 50.3 | 48.8 | 43.3 | 47.0 | 42.1 | 43.0 | 48.1 | |
| Stigmasterol | (wt. %) | 11.5 | 12.1 | 16.0 | 15.3 | 21.0 | 14.4 | 12.4 | |
| Campesterol | (wt. %) | 28.6 | 27.8 | 27.8 | 25.3 | 20.4 | 24.6 | 27.4 | |
| Brassicasterol | (wt. %) | 2.9 | 3.2 | 4.7 | 2.3 | 1.5 | 4.4 | 3.4 | |
| β-Sitostanol | (wt. %) | 0.2 | 0.02 | 0.8 | 0.2 | 0.3 | 0.1 | 0.2 | |
| Total content of phytosterol | (wt. %) | 93.5 | 91.9 | 92.6 | 90.2 | 85.3 | 86.5 | 91.4 | |
| Hydrocarbon having 29 carbon atoms | (wt. %) | Trace | 0.02 | 0.25 | 0.40 | 0.99 | 2.20 | 0.66 | |
| Hydrocarbon having 30 carbon atoms | (wt. %) | Trace | Trace | Trace | 0.07 | 0.17 | 0.10 | 0.03 | |
| Hydrocarbon having 31 carbon atoms | (wt. %) | Trace | 0.01 | 0.05 | 0.33 | 0.83 | 0.90 | 0.27 | |
| Total content of hydrocarbons having 29 to 31 carbon atoms | (wt. %) | 0 | 0.03 | 0.30 | 0.80 | 1.99 | 3.20 | 0.96 | |
| Content of hydrocarbons having 29 to 31 carbon atoms per 100 parts by weight of phytosterol | (parts by weight) | 0.00 | 0.03 | 0.32 | 0.88 | 2.33 | 3.70 | 1.05 | |
| Result | | | | | | | | | |
| Condition after 24 hours at 5° C. | | Remained clear | Remained clear | Remained clear | Remained clear | Become turbid | Become turbid | Remained clear | Remained clear |
| Condition after 24 hours at 0° C. | | Remained clear | Remained clear | Remained clear | Remained clear | Become turbid | Become turbid | Become turbid | Remained clear |

6. The edible oil composition according to claim 1, wherein said composition exhibits a ratio of transmission of ≧82%.

7. The edible oil composition according to claim 1, wherein said composition exhibits a ratio of transmission of ≧85%.

8. The edible oil composition according to claim 1, wherein said composition exhibits a ratio of transmission of ≧90%.

9. A process for producing an edible oil composition, which is liquid at normal temperature, which comprises dissolving a phytosterol composition the content of hydrocarbons having 29 to 31 carbon atoms in which is at most 1 part by weight per 100 parts by weight of phytosterol in an oil comprising at least 15% by weight of diacylglycerol so as to give a phytosterol concentration of 2 to 10% by weight.

10. The production process according to claim 9, wherein said oil comprises 30 to 95% by weight of diacylglycerol.

11. The production process according to claim 9, wherein said oil comprises 55 to 95% by weight of diacylglycerol.

12. The production process according to claim 9, wherein said phytosterol is present in amount of 2% by weight to less than 5% by weight.

13. The production process according to claim 9, wherein said content of the hydrocarbons having 29 to 31 carbon atoms in said oil is at most 0.9 parts by weight per 100 parts by weight of the phytosterol.

* * * * *